United States Patent [19] [11] 4,200,696
Biglione et al. [45] Apr. 29, 1980

[54] PROCESS FOR PREPARING EXPANDIBLE PARTICLES OF STYRENE-BASED POLYMERS

[75] Inventors: Gianfranco Biglione, Mantova; Guido Bertazzoni, Campitello Di Marcaria; Antonio Alvares, Mantova, all of Italy

[73] Assignee: Montedison S.p.A., Milan, Italy

[21] Appl. No.: 15,599

[22] Filed: Feb. 27, 1979

Related U.S. Application Data

[63] Continuation-in-part of Ser. No. 444,391, Feb. 21, 1974, abandoned, Ser. No. 660,629, Feb. 23, 1976, abandoned, and Ser. No. 820,243, Jul. 29, 1977, abandoned.

[51] Int. Cl.² ............................ C08V 9/12; C08J 9/22
[52] U.S. Cl. .................................. 521/58; 521/88; 521/98; 521/114; 521/907
[58] Field of Search .................. 521/58, 88, 114, 907

[56] References Cited

U.S. PATENT DOCUMENTS

| | | | |
|---|---|---|---|
| 3,271,333 | 9/1966 | Eichhorn | 521/907 |
| 3,324,076 | 6/1967 | Elder et al. | 260/45.7 R |
| 3,401,127 | 9/1968 | Stephenson | 521/907 |
| 3,576,770 | 4/1971 | Evans et al. | 521/907 |
| 3,631,132 | 12/1971 | Westernacher | 521/907 |
| 3,639,302 | 2/1972 | Brown et al. | 521/907 |
| 4,029,614 | 6/1977 | Nintz et al. | 521/907 |

*Primary Examiner*—Morton Foelak

[57] ABSTRACT

There is disclosed a process for the preparation of expandible particles of styrene-based polymers which are useful for the production of molded bodies, especially large blocks, having a uniform cellular structure, and with a particularly short time of residence in the mold.

16 Claims, No Drawings

PROCESS FOR PREPARING EXPANDIBLE PARTICLES OF STYRENE-BASED POLYMERS

This is a continuation-in-part of our applications Ser. No. 444,391 filed Feb. 21, 1974, now abandoned Ser. No. 660,629 filed Feb. 23, 1976, now abandoned and Ser. No. 820,243 filed July 29, 1977 now abandoned.

THE PRIOR ART

It is known to obtain shaped bodies from expanded styrene-based polymers by molding fine particles of the polymers containing gaseous or liquid expanding agents in closed (not gas-tight) molds at a temperature exceeding the boiling point of the expanding agent and the softening point of the polymeric material.

According to the usual method, the polymer particles containing the expanding agent are first heated (pre-expanded) in either an open or closed vessel until the particles reach a preestablished apparent density and then, after a certain ageing period, further expanded by heating (molding) in a pressure-resistant mold which is not gas-tight. As a consequence of the heating in the mold, the particles sinter to a body having the shape of the mold. The molded body or object is allowed to cool in the mold for a period of time sufficient to avoid deformation thereof during or after removal from the mold.

To reduce the residence time in the mold, it has been suggested to incorporate small amounts of organic halogenated compounds, and generally bromine, chlorine or chloro-bromo derivatives in the styrene-based polymer.

However, that practice is not completely free of drawbacks. In fact, while incorporation of the organic halogenated compounds suggested in the art in the starting styrene-based polymer results in a reduction, and even a considerable reduction, in the residence time in the mold, it is difficult to obtain blocks of expanded polymers which exhibit the following compendium of desirable characteristics:

(a) short residence time in the mold;
(b) shrinkage of the block thickness $\leq 1\%$;
(c) (total) moisture content of the expandible particles $\leq 0.3\%$;
(d) fine-cell homogeneous structure of the expanded block; and
(e) absence of odors during the pre-expansion step.

THE PRESENT INVENTION

One object of this invention is to provide a process for preparing expandible particles of polystyrene or styrene copolymers suitable for producing molded bodies having a homogeneous fine-cell structure and high-quality characteristics, using organic halogenated compounds for reducing the residence time in the mold, but which process is free of the drawbacks mentioned above.

This and other objects are attained by the present process for preparing shaped bodies based on expanded styrene-based polymers which comprises, in the order given: polymerization of styrene or a mixture thereof with another monomer copolymerizable therewith; addition of an expanding agent, preferably during the polymerization; pre-expansion of the expandible particles; ageing of the pre-expanded particles followed by molding of the aged particles in a pressure resistant but not gas-tight mold, in which process, and in accordance with this invention, the polymerization is carried out in the presence of 0.001 to 0.5 percent by weight of an organic brominated compound having the general formulae I and/or II:

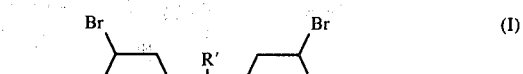

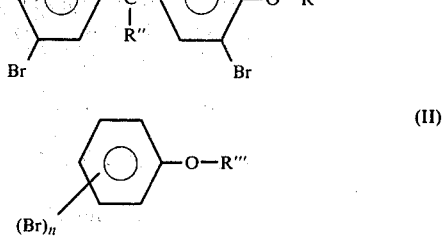

In the formulae given, R' and R" represent the same or different lower alkyl radicals, preferably methyl and ethyl, and are optionally halogenated; R''' and R'''' in formula (I) represent the same or different hydrocarbon groups containing 1 to 8 carbon atoms, and which are partially or wholly halogenated, preferably with bromine; R''' in formula (II) is a hydrocarbon group containing from 1 to 8 carbon atoms and is partially or wholly halogenated; and n is an integer from 1 to 5.

Surprisingly, we found that the expandible polymeric particles prepared according to the method of this invention, and expanded shaped bodies molded from them, in particular blocks, have all of the following characteristics contemporaneously:

(a) a short time residence in the mold, generally equal to or less than 50% of the time required for cooling the blocks obtained from pre-expanded particles not containing the organic brominated additive of this invention;
(b) shrinkage of the block thickness $\leq 1\%$;
(c) (total) moisture in the expandible particles below 0.3% and practically identical with that of the particles prepared in the absence of the organic brominated additive used in the practice of this invention;
(d) fine-cell homogeneous structure of the expanded block; and
(e) complete absence of acrid odors (vapors of bromine, of hydrobromic acid or of organic bromoderivatives, etc.,) during the pre-expansion step.

The organic brominated compounds useful for achieving the objects of this invention may be selected from a wide range of organic brominated compounds having formulae I and/or II.

Particularly good results are attained with organic brominated compounds having the general formula (I) in which R' and R" are the same or different and are $CH_3$— or $CX_3$ groups in which X is a halogen such as fluorine, bromine or chlorine; and R''' and R'''' are halogen-substituted alkyl groups of the type

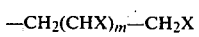

in which m is an integer from 1 to 3 and X is a halogen, preferably bromine.

One presently preferred compound of formula I is 2,2-bis[4(2,3-dibromopropoxy)-3,5-dibromophenyl]propane:

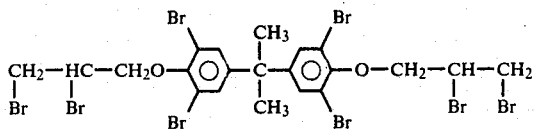

· Similarly, particularly good results are obtained using compounds having general formula (II) in which R''' represents a halogen-substituted alkyl group of the type:

$$-CH_2-(CHX)_m-CH_2X$$

in which m is an integer from 1 to 3 and X is a halogen, preferably bromine.

One presently preferred brominated compound of formula (II) is:

Compounds of formula (I) and of formula (II) may be used in admixture.

Other presently preferred brominated compounds of formulae I or II are:

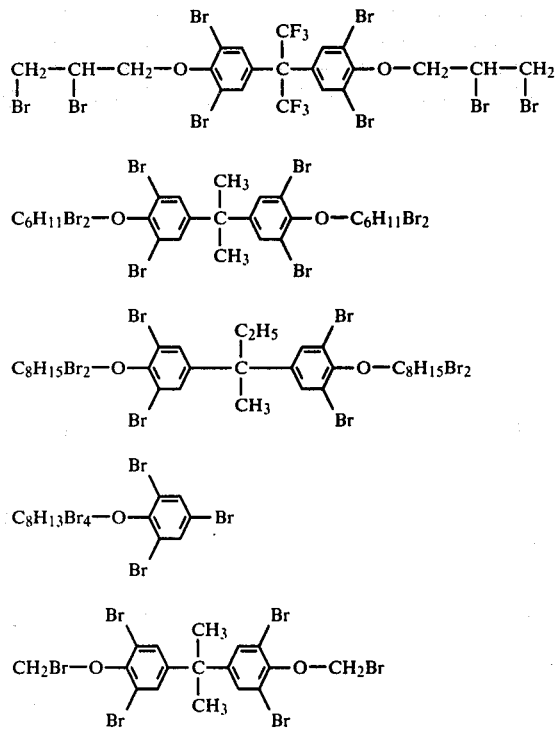

The brominated compounds are usually added to the styrene or mixture thereof with at least one other polymerizable comonomer prior to the polymerization, optionally in admixture with the expanding agents.

As indicated, the brominated compound is used in an amount of from 0.001% to 0.5% by weight. Within that range, the optimum range for the same brominated compound depends on the characteristics of the polymeric matrix, i.e., its molecular weight.

For achieving the objects of this invention, that is for obtaining expanded shaped bodies molded from the expandable polymeric particles, and in particular blocks, having all of the characteristics (a) to (e) listed supra, the brominated compounds of formulae I and II should not be used in an amount higher than 0.5% by weight, since we have found that at higher amounts of the brominated compounds, for instance 0.8%, the properties of both the styrene polymer expandible particles and of the blocks of expanded styrene polymer are very poor, as is apparent from test 5 of Example II and reported in Table 2 below.

In that test, using a polymeric matrix with a molecular weight (Staudinger) of about 64,000 and a density of the molded block of 24 kg/m$^3$ and 0.8% by weight of the brominated compound of Example Ia, the properties of both the polystyrene expandible particles and of the molded polystyrene blocks are clearly very poor, with specific reference to the total moisture of the expandible particles, the presence of odors during pre-expansion, the shrinkage greater than 1% and, finally, the low quality of the molded block, which had non-homogeneous and large cells.

In contrast, and as shown by test 4 of Example II, using a polymeric matrix of the same molecular weight (about 64,000) and density (24 kg/m$^3$) but 0.5% of the brominated compound of Example Ia, the total moisture of the expandible particles was 0.28%, there was no odor during the pre-expansion, the cooling time was 54 minutes (compared to 105 minutes in the absence of the brominated compound), the shrinkage was 0.8% and the molded block was of high quality, having homogeneous and fine-cell structure.

Similarly good results are obtained using 0.1% of the brominated compound of Example Ia with a polymeric matrix having a molecular weight (Staudinger) of 52,000 and density of the molded block of 20 kg/m$^3$ as shown by test 2 of Table II.

The results of the tests establish that, for the same brominated compound, the concentration to get the best results depends on the properties of the polymeric matrix, that this concentration can be readily determined empirically and that in any case the amount of brominated compound of formulae I or II should not exceed the upper limit of 0.5% by weight, as disclosed in our parent application, Ser. No. 444,391, and should be restricted to the range 0.001 to 0.5% by weight, preferably 0.005 to 0.5% by weight, and even more preferably 0.01 to 0.5% by weight.

The term "styrene-based polymer" as used herein includes the homopolymer, polystyrene, as well as copolymers of styrene with other vinyl and/or vinylidene monomers, which copolymers contain at least 50% by weight of chemically combined styrene.

Examples of suitable comonomers are alpha-methylstyrene, nuclearly halogenated styrenes, acrylonitrile, methacrylonitrile, esters of acrylic and/or methacrylic acid with alcohols containing from 1 to 8 carbon atoms and N-vinyl compounds, such as vinylcarbazole. The class constituted by the styrene-based copolymers includes also the copolymers containing, besides styrene and, optionally, the aforesaid vinyl and/or vinylidene monomers, also small amounts of monomers containing two double bonds, such as, for instance, divinylbenzene.

The compounds used as expanding agents for the styrene-based polymers may be selected from a wide class of compounds the characteristics of which are known to those skilled in the art.

Particularly suitable for use in the present process are the aliphatic hydrocarbons, either individually or in proper admixtures, and containing from 2 to 6 carbon atoms, such as propane, butane, pentane, hexane, cyclohexane and the like, and the halogenated derivatives of aliphatic hydrocarbons containing from 1 to 3 carbon atoms, such as e.g., chlorofluoro-derivatives of methane, of ethane or of ethylene.

Besides the expanding agents, the styrene-based polymers according to this invention may contain other additives, such as, for example, flame-extinguishing agents, organic and inorganic fillers, dyes, antistatic agents, anti-agglomerating agents to prevent the formation of crumbs during the pre-expansion, plasticizers and other analogous compounds.

Polymerization of styrene, preferably in an aqueous suspension, admixture of the expanding agent, preferably during polymerization, pre-expansion of the expandible particles thus obtained, ageing and transformation of the pre-expanded and aged particles into shaped bodies, by molding in closed molds, are carried out according to known techniques such as are described in "Rigid Plastic Foams" by T. N. Ferrigno, Reinhold Publishing Corp., New York, USA (1963).

The following examples are given to illustrate the essential features of the present invention, and are not intended to be limiting:

EXAMPLE I

Various aqueous suspension polymerization tests were carried out starting from a mixture made up of:

| | Parts by Weight |
|---|---|
| monomeric styrene | 100. |
| deionized water | 100. |
| polymerization initiator (1) | 0.20 |
| suspending agent (2) | 0.05 |
| NaCl | 0.1 |
| organic brominated compound (3) | 0.1 |

(1) mixture of tert.-butylperoxide and tert.-butyl-perbenzoate;
(2) acrylic acid/2-ethyl-hexylacrylate copolymer (ratio by weight = 89/11)
(3) different types of organic brominated compounds dissolved in styrene and having the following formulas:

(a) 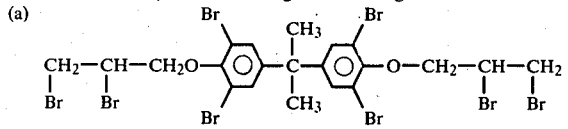

(b) 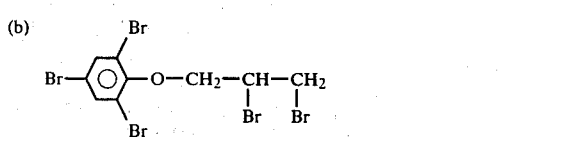

(c) 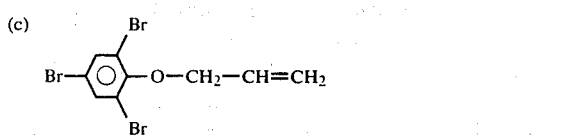

(d)

Br
Br—⟨O⟩—O—CH$_2$—CH$_2$—CH$_3$
Br

[Note: Compounds (a) and (b) are in accordance with this invention, while compounds (c) and (d) are given merely for comparative purposes.]

The polymerization was carried out at temperatures comprised between 100° C. and 140° C. for a total period of 20 hours.

During the polymerization step, 8 parts by weight of an expanding agent consisting of a mixture of n-pentane and isopentane (ratio by weight=70/30) were admixed to the aforesaid suspension.

After cooling to room temperature, filtering, washing with water, and drying at 35°–40° C. for 7 hours, the polymer was subjected to screening in order to obtain expandible polystyrene particles having diameters comprising between 0.9 and 1.6 mm. Said particles contained about 6% by weight of expanding agent.

The expandible particles were admixed with a conventional non-agglomerating agent in an amount equal to 0.15% by weight. The admixing was carried out in a SAGA screw-mixer, at room temperature, for about 10 minutes.

The expandible particles thus treated were fed to a pre-expander, (Erlenbach Mod. K2), with screw-inlet on the bottom and outlet of the pre-expanded material from the top, in which they were pre-expanded by means of steam at 95°–100° C. for about 5 minutes.

The pre-expanded particles were allowed to age in air, at room temperature, for approximately 24 hours, and were then introduced into a RAUSCHER block-making press until filling of a mold having the following dimensions: 100×100×50 cm. Molding was effected by means of steam at 1 atm. gauge.

The cooling time of the blocks, which depends on the type of organic brominated compound employed, is the time required to cause the pressure inside the block to fall to zero, at the conclusion of the treatment with steam.

The degree of both shrinkage and sintering of the blocks was determined 48 hours after molding thereof. The percent shrinkage was determined by measuring the width of the block at a height of 50 cm. (No shrinkage if width is 50 cm.) The degree of sintering was determined on a thin plate obtained from the center of the block by hot-slinging and as the percentage of expanded particles which broke when the plate was broken.

From Table I it can be seen that:
  expandible particles with a moisture content equal to that of the particles prepared in the absence of brominated compounds;
  complete absence of odors during pre-expansion;
  remarkably lower cooling time as compared with that of blocks obtained from particles prepared in the absence of brominated compounds;
  block shrinkage ≦ 1%;
  high sintering degree (70%); and
  fine-cell homogeneous structure
can be achieved only by using organic brominated compounds of type (a) or (b), according to this invention, while in the remaining cases molded blocks are obtained with at least one not throughly satisfactory property, e.g.,: cooling time in case (d); block shrinkage percentage, sintering degree, beads moisture and odors during pre-expansion in case (c).

screened to obtain expandible polystyrene particles having a diameter between 0.8 and 2.3 mm. The particles contained about 5.5% by weight of expanding agent. Using 0.05 parts by weight of chain-transfer agent, the polymer obtained had a molecular weight

TABLE I

| Type of organic brominated compound | — | a | b | c | d |
|---|---|---|---|---|---|
| Amount percent | — | 0.1 | 0.1 | 0.1 | 0.1 |
| (Total) moisture of the expandible particles, in percent | 0.22 | 0.22 | 0.25 | 0.75 | 0.20 |
| Odors during pre-expansion | none | none | none | acrid | none |
| Characteristics of the molded block | | | | | |
| Density, kg/cm$^3$ | 20 | 20 | 20 | 20 | 20 |
| Cooling time, minutes | 60 | 28 | 32 | 23 | 55 |
| Shrinkage of the block thickness, percent | ≦1 | ≦1 | ≦1 | 3.0 | ≦1 |
| Sintering degree of the broken particles, percent | 70 | 70 | 70 | 55 | 70 |
| Cellular structure of the expanded beads | homogeneous fine cells | homogeneous fine cells | homogeneous fine cells | homogeneous large cells | homogeneous fine cells |

EXAMPLE II

The polymerization was carried out in aqueous suspension starting from mixtures made up of

|  | Parts by Weight |
|---|---|
| styrene | 100. |
| deionized water | 100. |
| polymerization initiator (1) | 0.2 |
| suspending agent (2) | 0.05 |
| sodium chloride | 0.1 |
| expanding agent (3) | 8. |
| chain-transfer agent (4) | 0.05 or 0.01 |
| bromo compound (5) | 0.1–0.5 |

(1) a mixture of ditertiary-butyl-peroxide and tertiary-butyl-perbenzoate
(2) acrylic acid/2-ethylhexyl acrylate copolymer (ratio by weight = 89/11), Monsanto USA
(3) mixture of pentane and iso-pentane (ratio by weight = 70/30)
(4) tertiary-dodecyl-mercaptan, Phillips Petroleum Co., USA
(5) product marketed under the trademark "Bromkal 66-8" by Chemische Fabrik Kalk GmbH, Germany, and having the formula $$\underset{Br}{\overset{Br}{\underset{|}{CH_2CH}}}-\underset{Br}{\overset{Br}{\underset{|}{CH_2}}}-O-\underset{Br}{\overset{Br}{\bigcirc}}-\underset{CH_3}{\overset{CH_3}{\underset{|}{C}}}-\underset{Br}{\overset{Br}{\bigcirc}}-O-\underset{Br}{\overset{Br}{\underset{|}{CH_2CH}}}-\underset{Br}{\overset{Br}{\underset{|}{CH_2}}}$$

and a bromine content of 65–67% by weight. This bromo compound corresponds to the brominated compound (a) of Example I supra.

Two series of tests were carried out, the first with 0.05 parts by weight of the chain-transfer agent, the second with 0.01 parts by weight thereof.

The polymerization temperature was between 110° C. and 135° C.; the total polymerization time was 14 hours.

During the last part of the polymerization, 8 parts by weight of the expanding agent were added to the suspension.

At the end of the polymerization, the suspension of polystyrene expandible particles was cooled to room temperature, filtered, washed with water and dried at 35°–40° C. for 7 hours; the polymeric particles were (Staudinger) of about 52,000; using 0.01 parts by weight of chain-transfer agent, the polymer obtained had a molecular weight (Staudinger) of about 64,000.

The particles were tested to determine the percent total moisture thereof, using the Karl Fisher reagent.

The expandible polymer particles were then admixed with a conventional non-agglomerating composition made up of 0.05 parts by weight of $SiO_2$ (a product marketed by Fullstoff GmbH, Germany, under the trademark "Ultrasil VN3"), and 0.05 parts by weight of zinc stearate. The mixing was carried out in a SAGA screw-mixture, at room temperature, for about 10 minutes.

The expandible particles thus treated were fed to a pre-expander (Erlenbach Model K2) with a screw inlet on the bottom and outlet of the pre-expanded particles from the top, in which they were pre-expanded by means of steam at 95°–100° C. for about 5 minutes.

The pre-expanded particles were aged in air at room temperature for about 24 hours, after which the aged particles were introduced into a Rauscher block-making press until the mold having the dimensions 100×100×50 cm was filled. The molding was effected by steam at 1 atm. gauge.

The cooling of the blocks, which depends on the amount, in the specified range, of brominated compound used, is the time required to cause the pressure inside the block to fall to zero, at the conclusion of the steam-treatment.

The degree of both shrinkage and sintering of the blocks was determined 48 hours after molding thereof. The percent shrinkage was determined by measuring the width of the block at a height of 50 cm. (No shrinkage if width is 50 cm.). The degree of sintering was determined on a thin plate obtained from the center of the block by hot-slinging and as the percentage of expanded particles which broke when the plate was broken.

The following Table II shows the amount of brominated compound used in the different tests and the moisture content of the expandible particles, the presence (if any) of odors during the pre-expansion, and the characteristics of the molded blocks depending on the given amount of the brominated compound used.

TABLE II

| TEST NUMBER | 1 | 2 | 3 | 4 | 5 |
|---|---|---|---|---|---|
| Bromo-compound Amount Parts by Weight | — | 0.1 | — | 0.5 | 0.8 |
| Molecular Weight (Staudinger) of | 52,000 | 52,000 | 64,000 | 64,000 | 64,000 |

TABLE II-continued

| TEST NUMBER | 1 | 2 | 3 | 4 | 5 |
|---|---|---|---|---|---|
| Polystyrene | | | | | |
| Total Moisture of Expandable Particles % | <0.3 | <0.3 | <0.3 | 0.28 | 0.6 |
| Odors During Pre-expansion | absent | absent | absent | absent | slight |
| Properties of the Molded Block | | | | | |
| Density : kg/m$^3$ | 20 | 20 | 24 | 24 | 24 |
| Cooling Time: Minutes | 69 | 44 | 105 | 54 | 45 |
| Shrinkage of the Block Thickness: % | ≦1 | ≦1 | ≦1 | 0.8 | 1.6 |
| Sintering Degree: % | 70 | 70 | 70 | 70 | 70 |
| Cellular Structure of Expanded Particles | Homogeneous Fine Cells | Homogeneous Fine Cells | Homogeneous Fine Cells | Homogeneous Fine Cells | Dishomogeneous Large Cells |

EXAMPLE III

The polymerization was carried out in aqueous suspension starting from mixtures made up of

| | Parts By Weight |
|---|---|
| stryene | 100. |
| deionized water | 100. |
| polymerization initiator (1) | 0.2 |
| suspending agent (2) | 0.05 |
| NaCl | 0.1 |
| expanding agent (3) | 8. |
| chain-transfer agent (4) | 0.05 |
| bromo-compounds (5) | in varying amounts from 0.1 to 2.0% by weight. |

(1) a mixture of ditertiary-butyl-peroxide and tertiary-butyl-perbenzoate
(2) acrylic acid/2-ethylhexyl acrylate copolymer (weight ratio = 89/11 (product of Monsanto, USA).
(3) mixture of pentane and iso-pentane in a weight ratio of 70/30
(4) tertiary-dodecyl-mercaptan (product of Phillip's Petroleum Co., USA)
(5) (A) "Bromkal 66-8" as in Example II.
(B) product marketed by Chemische Fabrik Kalk GmbH, Germany, under the trademark "Bromkal 73-5PE", having the following formula:

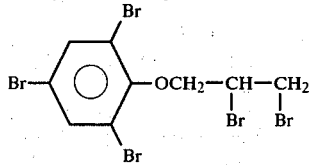

and a bromine content of 73-75% by weight.
(C) a product marketed by Chemische Fabrik Kalb GmbH, Germany under the trademark "Bromkal 64-3AE", having the formula

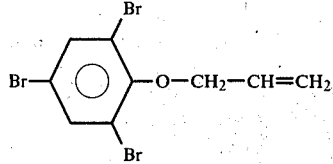

and a bromine content of 63-65% by weight.
(D) product obtained from (C) above by non-nuclear hydrogenation and thus having the formula

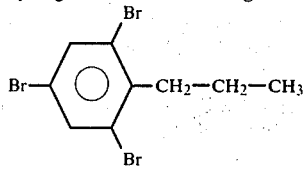

The polymerization temperature was between 110° C. and 135° C.; the total polymerization time was 14 hours.

During the last part of the polymerization, 8 parts by weight of the expanding agent were added to the suspension.

At the end of the polymerization, the suspension of polystyrene expandible particles was cooled to room temperature, filtered, washed with water and dried at 35°-40° C. for 7 hours; the polymeric particles were screened to obtain expandible polystyrene particles having a diameter between 0.8 and 2.3 mm. The particles contained about 5.5% by weight of expanding agent. These particles were tested to determine the total moisture content (%), using the Karl Fischer reagent.

Said particles were then mixed with a conventional nonagglomerating composition made up of 0.05 parts by weight of SiO$_2$ ("Ultrasill VN3", product of Fullstoff GmbH, Germany) and 0.05 parts by weight of zinc stearate. The mixing was carried out in a SAGA screw-mixer, at room temperature, for about 10 minutes.

The treated particles were fed to a pre-expander (Erlenbach Model K2) with a screw-inlet on the bottom and outlet for the pre-expanded particles at the top, and in which the particles were pre-expanded by steam at 95°-100° C. for about 5 minutes.

The pre-expanded particles were aged in air at room temperature for about 24 hours and then introduced into a Rauscher block-making press until the mold, having the dimensions 100×100×50 cm, was filled. Molding was effected using steam at 1 atm. gauge.

The cooling time of the blocks, which depends on both the type and amount of brominated compound used, is the time required for the pressure inside the block to fall to zero, at the conclusion of the steam-treatment. 48 hours after the molding operation, the flame-extinguishing characteristics, the extent of shrinkage and the degree of sintering of the blocks were determined.

The flame-extinguishing characteristics were evaluated according to British Standard 3837-1965, a modification of ASTM-D 635 T-56.

The extent of shrinkage was determined by measuring the width of the block at a height of 50 cm, (no shrinkage if width is 50 cm.) and was expressed as percentage variation from 50 cm.

The degree of sintering was evaluated on a thin plate obtained from the center of the block by hot-slinging and determined as the percentage of expanded particles which broke when the plate was broken.

The moisture content of the expandible particles, the presence (if any) of odors during the pre-expansion, and the characteristics of the molded blocks obtained using the given kind and amount of brominated compound are shown in Table III.

As is apparent from Table III, (a) bromo-compounds (A) and (B) are good nucleating agents even at very low concentration; in fact when long cooling time would not be adopted to manufacture of the blocks on a commericial scale.

TABLE III

| TEST NUMBER | 1 | 2 | 3 | 4 | 5 | 6 | 7 |
|---|---|---|---|---|---|---|---|
| Bromo-Compound | | | | | | | |
| Type % by weight | — | A | A | B | B | C | D |
| Amount % by Weight | — | 0.1 | 2 | 0.1 | 2 | 0.1 | 0.1 |
| Total Moisture of | | | | | | | |
| Expandible Particles: % | <0.3 | <0.3 | 1.2 | <0.3 | 1.1 | 0.8 | 0.3 |
| Odors During Pre-Expansion | none | none | strong | none | strong | strong | none |
| Properties of the Molded Block | | | | | | | |
| Density : kg/m$^3$ | 20 | 20 | 20 | 20 | 20 | 20 | 20 |
| Cooling Time: minutes | 67 | 42 | 9 | 45 | 6 | 35 | 65 |
| Shrinkage of the Block Thickness : % | ≦1 | ≦1 | 6 | ≦1 | 7 | 2.8 | ≦1 |
| Sintering Degree : % | 70 | 70 | 60 | 70 | 60 | 60 | 70 |
| Cellular Structure | Homogeneous Fine Cells | Homogeneous Fine Cells | Dishomogeneous Large Cells | Homogeneous Fine Cells | Dishomogeneous Large Cells | Dishomogeneous Large Cells | Homogeneous Fine Cells |
| Self-Extinguishing Characteristic | Burning | Burning | Burning | Burning | Burning | Burning | Burning | used in amounts of 0.1 parts by weight (see tests 2 and 4) are actually capable of reducing the cooling time in comparison with the blank test (test 1) without any lowering of the other properties of the molded block occurring and without having an increase of moisture in the expandible particles or the development of odors during the pre-expansions; however these bromo-compounds, at least up to 2 parts by weight, display no flame extinguishing action, since the molded blocks thus obtained (see tests 5–7) always burn;

(b) bromo-compounds (B), (C) and (D) with a chemical structure very close, when used in the same amounts (0.1 parts by weight) display a quite different nucleating action (see tests 4, 6 and 7). More particularly, all the properties of the block of test 4 are quite acceptable; on the contrary when operating according to test 6, the following drawbacks occur:
total moisture > 0.3% (0.8%)
strong odors during the pre-expansion
shrinkage > 1% (2.8%)
dishomogeneous large cells
Commercial utility for such a block is not readily apparent. When operating according to test 7, the cooling time (65 min.) is practically the same as that of the blank test; in other words under these conditions, the bromo-compound does not exert any nucleating action. A process which would require such a (c) the bromo-compounds under examination, when used as nucleating agents (that is in very low amounts: 0.1-parts by weight) yield expanded polymers which burn (see tests 2, 4, 6 and 7); moreover, even if used in amounts (2 parts by weight) for which the conventional flame-retardant agents yield flame-extinguishing or non-burning polymers, these bromo-compounds still lead to polymers which burn (see tests 3 and 5);

(d) these bromo-compounds, when used in amounts for which the conventional flame-retardant agents lead to self-extinguishing or non-burning polymers, do not yield self-extinguishing polymers; moreover, during the preparation of the expandible particles, some drawbacks occur and the molded blocks thus obtained are endowed with poor properties. More particularly (see tests 3 and 5), the moisture of the expandible particles is > 0.3% (1.1–1.2%); there are strong odors during the pre-expansion, the shrinkage of the block is > 1% (6–7%) and, finally, the expanded particles result in largecell dishomogeneous blocks. A process involving the addition of 2% of these bromo-compounds to styrene during the polymerization, and having the drawbacks noted, could not be carried out on a commercial scale.

EXAMPLE IV

Example I was repeated, using, respectively, the following brominated compounds (e) to (i), with the results shown in the following Table IV:

TABLE IV

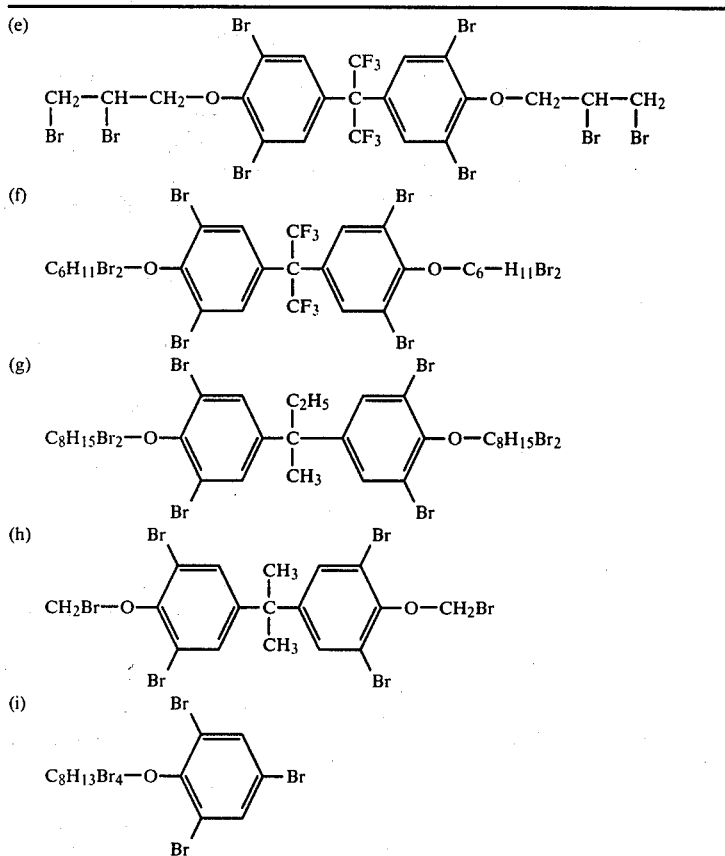

| Type of organic brominated compound | e | f | g | h | i |
|---|---|---|---|---|---|
| Amount percent | 0.15 | 0.05 | 0.05 | 0.20 | 0.05 |
| Moisture of the expandable particles in percent | 0.25 | 0.23 | 0.23 | 0.21 | 0.23 |
| Odors during pre-expansion | none | none | none | none | none |
| CHARACTERISTICS OF THE MOLDED BLOCK | | | | | |
| Density, Kg/m³ | 20 | 20 | 20 | 20 | 20 |
| Cooling time, minutes | 31 | 28 | 27 | 33 | 29 |
| Shrinkage of the block thickness, percent | ≦1 | ≦1 | ≦1 | ≦1 | ≦1 |
| Sintering degree, percent | 70 | 70 | 70 | 70 | 70 |
| Cellular structure of the expanded beads | homogeneous fine cells | homogeneous fine cells | homogeneous fine cells | homogeneous fine cells | homogeneous fine cells |

What we claim is:

1. In a process for preparing shaped molded bodies of expanded styrene-based polymers which comprises, in the order stated, polymerizing, in the presence or absence of an expanding agent, styrene or a mixture of styrene with at least one other monomer copolymerizable therewith, adding the expanding agent if it was not present during the polymerization, pre-expanding the expandible particles obtained, ageing the pre-expanded particles, and molding the pre-expanded aged particles in a mold which is pressure-resistant but not gas-tight, the improvement which consists in
   (a) shortening the residence time in the mold;
   (b) restricting shrinkage of the shaped body thickness to ≦1%;
   (c) Restriction the (total) moisture content of the expandable particles to ≦3%;
   (d) insuring that the expanded shaped body will have an essentially uniform, fine-cell homogeneous structure; and
   (e) eliminating odors during the pre-expansion step: by
effecting the polymerization in the presence of at least one organic brominated compound having one of the following formulae:

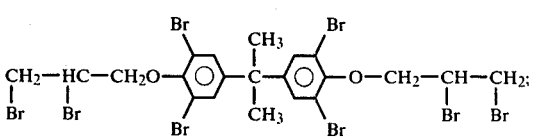

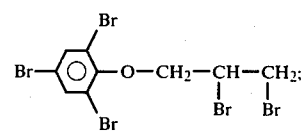

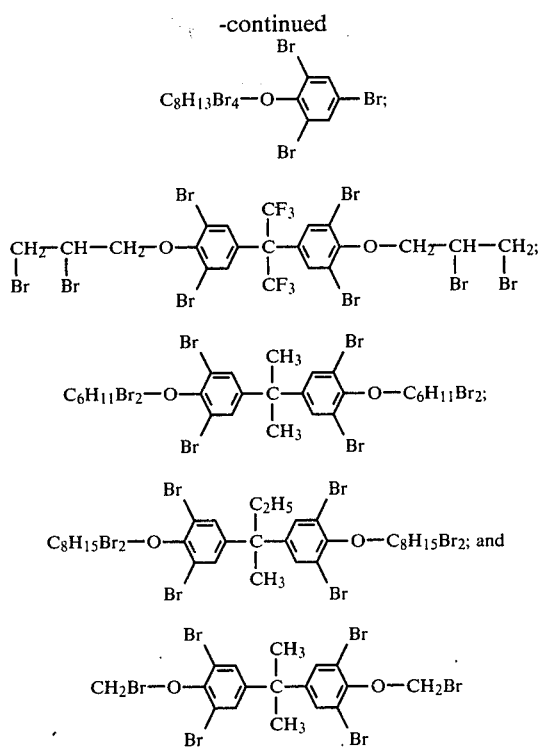

said organic brominated compound being used in an amount of from 0.001% to 0.5% by weight with respect to the weight of the styrene or mixture of styrene and at least one other monomer copolymerizable with styrene.

2. The process of claim 1, in which the brominated compound is present during the polymerization of styrene or mixture of styrene with at least one other monomer copolymerizable therewith.

3. The process of claim 1, in which the organic brominated compound has the formula:

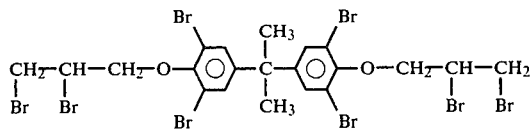

4. The process of claim 1, in which the organic brominated compound has the formula:

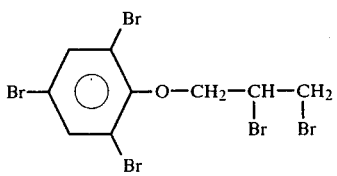

5. The process of claim 1, in which the organic brominated compound has the formula:

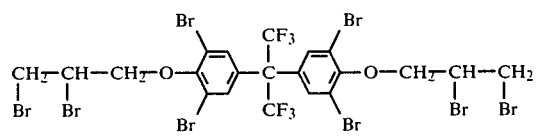

6. The process of claim 1, in which the organic brominated compound has the formula:

7. The process of claim 1, in which the organic brominated compound has the formula:

8. The process of claim 1, in which the organic brominated compound has the formula:

9. An expandible styrene-based polymer obtained by the process of claim 1.

10. Expandible polystyrene obtained by the process of claim 1.

11. An expandible copolymer of styrene and at least one other monomer copolymerizable therewith, said expandible copolymer being obtained by the process of claim 1.

12. An expandible copolymer according to claim 11, and in which the monomers copolymerized with the styrene are selected from the group consisting of alpha-methyl styrene, nuclearly halogenated styrenes, acrylonitrile, methacrylonitrile, esters of acrylic and/or methacrylic acid with alcohols containing from 1 to 8 carbon atoms, vinylcarbazole and divinylbenzene.

13. Blocks molded from particles of the expandible styrene-based polymers according to claim 9 and characterized by a short residence time in the mold, a shrinkage of the block thickness during the molding of ≦1%, and an essential uniform fine-cell homogeneous structure.

14. Expandible particles of a styrene-based polymer according to claim 9, said particles having a total moisture content of less than 0.3% and being further characterized by the complete absence of odors when the particles are subjected to pre-expanding conditions.

15. The process of claim 1, in which the organic brominated compound is used in an amount of 0.1 to 0.5% by weight with respect to the weight of the styrene or of the mixture of styrene and at least one other monomer copolymerizable with styrene.

16. The process of claim 1, in which the organic brominated compound has the formula

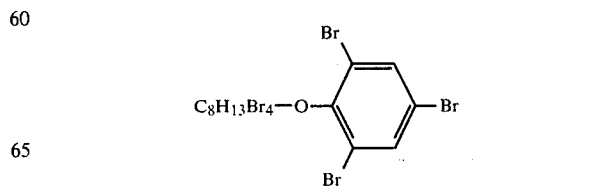

* * * * *